United States Patent [19]

Rust

[11] 4,224,830
[45] Sep. 30, 1980

[54] MECHANICAL MOTION CONTROL APPARATUS

[75] Inventor: Norbert Rust, St. Clair Shores, Mich.

[73] Assignee: Expert Automation, Inc., Detroit, Mich.

[21] Appl. No.: 868,889

[22] Filed: Jan. 12, 1978

[51] Int. Cl.³ .............................................. F16H 37/12
[52] U.S. Cl. ......................................... 74/52; 74/70
[58] Field of Search ................... 74/52, 70, 804, 112, 74/63

[56] References Cited

U.S. PATENT DOCUMENTS

| | | | |
|---|---|---|---|
| 1,727,194 | 9/1929 | Belin | 74/63 |
| 1,916,871 | 7/1933 | Swift, Jr. | 74/112 |
| 2,866,353 | 12/1958 | Ewing | 74/70 |
| 4,018,090 | 4/1977 | Brems | 74/52 |
| 4,089,228 | 5/1978 | Obra | 74/52 |

Primary Examiner—Kenneth Dorner
Attorney, Agent, or Firm—Harness, Dickey & Pierce

[57] ABSTRACT

There is disclosed herein a mechanical motion control mechanism which in one form may comprise an input shaft drivingly connected to an output shaft in such a manner that continuous rotation of the input shaft produces varying rotational movement of the output shaft characterized by an initial dwell period, an acceleration period, a constant velocity period, a deceleration period and another dwell period. The input and output shafts may be drivingly connected by means of a gear secured to the input shaft which is in meshing engagement with a second gear supported at one end of a pivot arm, the other end of which is secured to the output shaft. Rotational and revolving movement of this second gear is controlled by the interaction of a plurality of cam followers engaging a cam surface so as to allow rotational, revolving, and various desired combinations of such movements in response to rotational movement of the first gear. Alternatively, the input and output shafts may be drivingly connected by sprockets in place of the first and second gears with an interconnecting drive chain, belt or other similar devices. Also, if desired, the first and second gears may be replaced with wheels having circumferential frictional surfaces in mutual driving engagement. In yet another embodiment the input and/or output may be in the form of linear motion in which case the first gear may be replaced with a rack engaging the second gear in such a manner as to produce the above movement period sequence.

19 Claims, 10 Drawing Figures

Output Shaft

Input Shaft

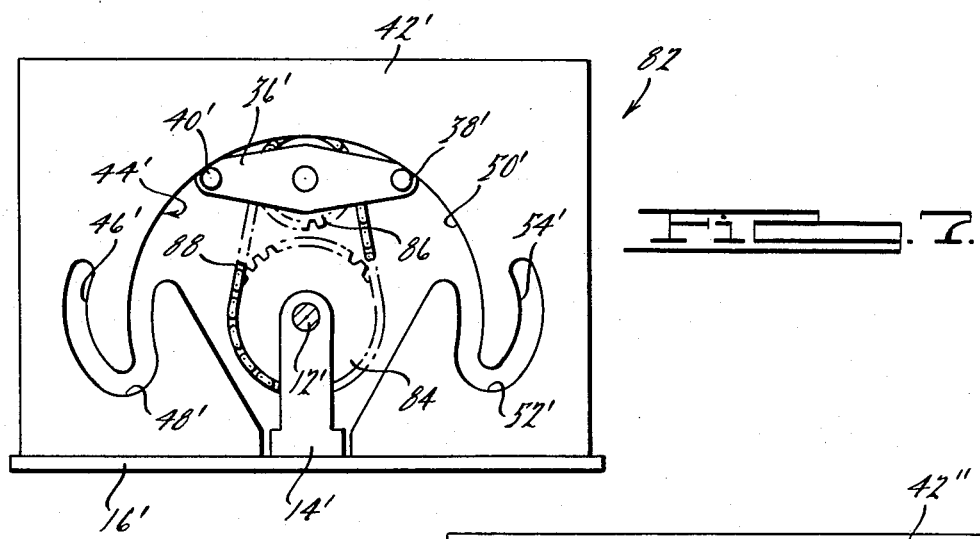
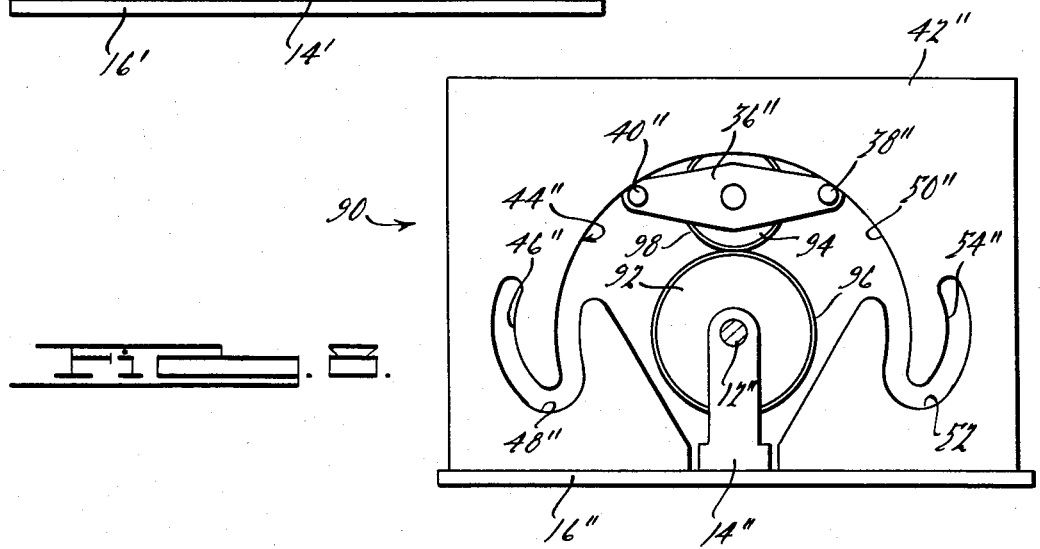
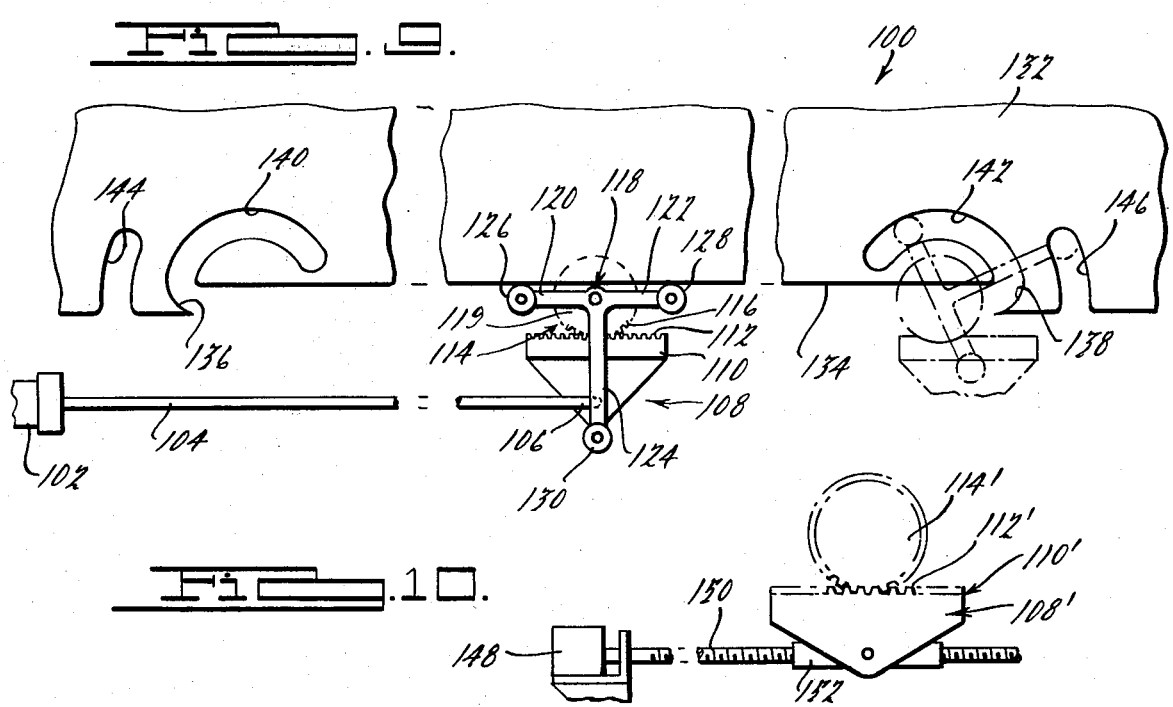

000
MECHANICAL MOTION CONTROL APPARATUS

BACKGROUND AND SUMMARY OF THE INVENTION

The present invention relates generally to motion control mechanisms and more particularly to such motion control mechanisms as are designed to provide respective periods of dwell, acceleration and constant velocity.

The use of gears and shafts to transmit rotational forces which may thereafter be converted to linear motion is well known, the same being employed in various arrangements of work transfer machinery. In certain applications this linear motion is reciprocal in nature employing a reversible electric motor or transmission to effect movement in opposite directions. Accordingly, mechanisms must be provided to shut off or disconnect the driving means from the member being moved so as to properly position same within a machine preparatory to an operation being performed on a workpiece. As any such movement cannot be stopped instantaneously, it is necessary to provide a deceleration period as well as being desirable to also provide a dwell period during which rotation of an input shaft will produce no rotation of an output shaft so as to enable maximum transfer speed and insure accuracy of positioning.

Accordingly, the present invention provides a mechanical motion control mechanism which provides a dwell period, acceleration period, constant velocity period, deceleration period and dwell period the relative lengths of which may be varied by alteration of the shape of the cam surface. In one form, the present invention employs a first gear, sprocket or wheel secured to a rotating input shaft which meshingly engages or is otherwise drivingly coupled to a second gear, sprocket or wheel supported on one end of a pivot arm the other end of which is connected to the output shaft. Cam followers are secured to the second gear and engage a stationary cam surface so as to control rotational and curvilinear movement of the second gear. In another embodiment a rack or the like is provided which is drivingly coupled to a gear, sprocket or wheel associated with output means upon which suitable cam followers are secured which cam followers engage a cam surface so as to control rotational and linear motion of the output means thereby providing controlled periods of dwell, acceleration, constant velocity, deceleration and dwell. Thus, the present invention provides a mechanical mechanism having a minimum number of moving parts which is capable of transmitting high torques thereby being operative to move massive articles which also provides a dwell period of sufficient duration to allow the drive means to be stopped without encountering overtravel. The present invention therefore greatly facilitates the transfer and positioning of articles such as workpieces within a machine.

Additional advantages and features of the present invention will become apparent from the subsequent description and the appended claims taken in conjunction with the accompanying drawings.

BRIEF DESCRIPTION OF THE DRAWINGS

FIG. 7 is a view similar to that of FIG. 5 but illustrating an alternative drive coupling between the input and output shafts;

FIG. 8 is also a view similar to that of FIG. 5 but illustrating yet another drive coupling between input and output shafts;

FIG. 9 is a fragmentary side elevational view of yet another embodiment of the present invention; and FIG. 10 is a fragmentary side elevational view similar to that of FIG. 9 but illustrating an alternative drive arrangement therefor.

DESCRIPTION OF THE PREFERRED EMBODIMENTS

Figure 1:
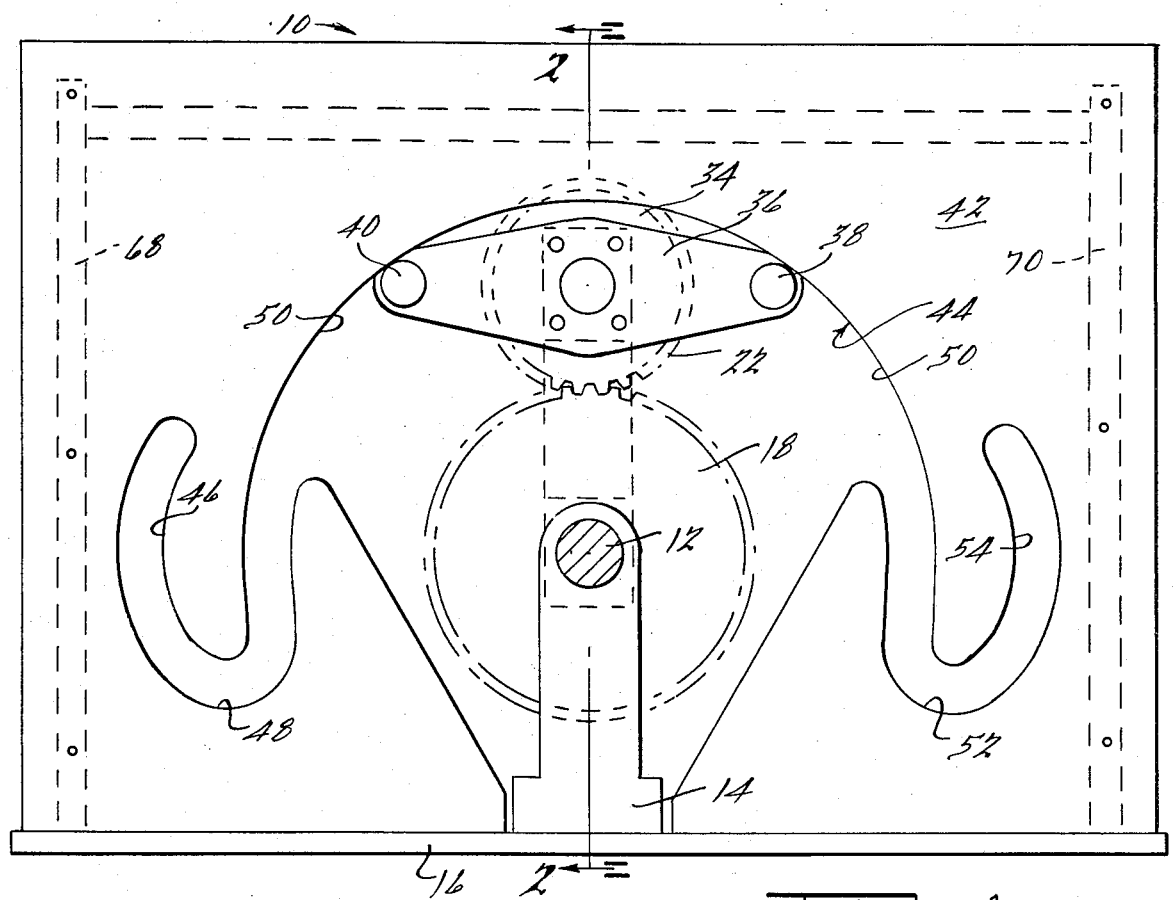
FIG. 1 is a front elevational view of the present invention showing the input shaft in section.
Figure 2:
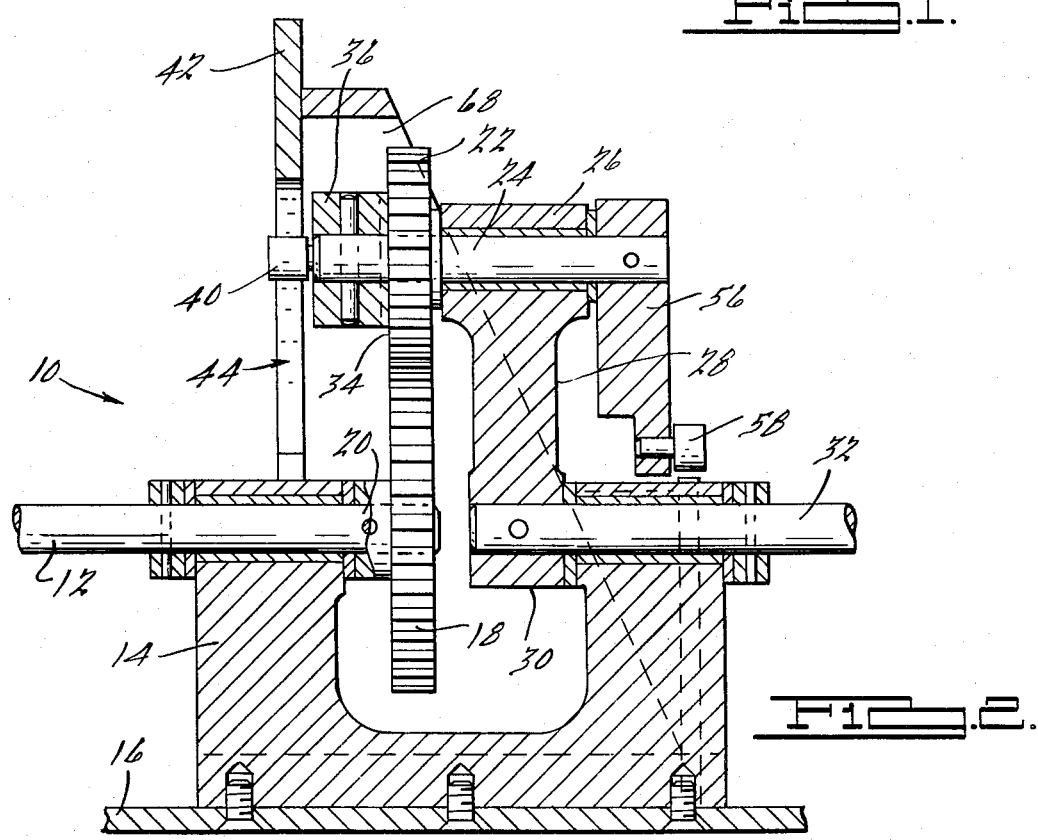
FIG. 2 is a transverse sectional view of the present invention, the section being taken along line 2—2 of FIG. 1.
Figure 3:
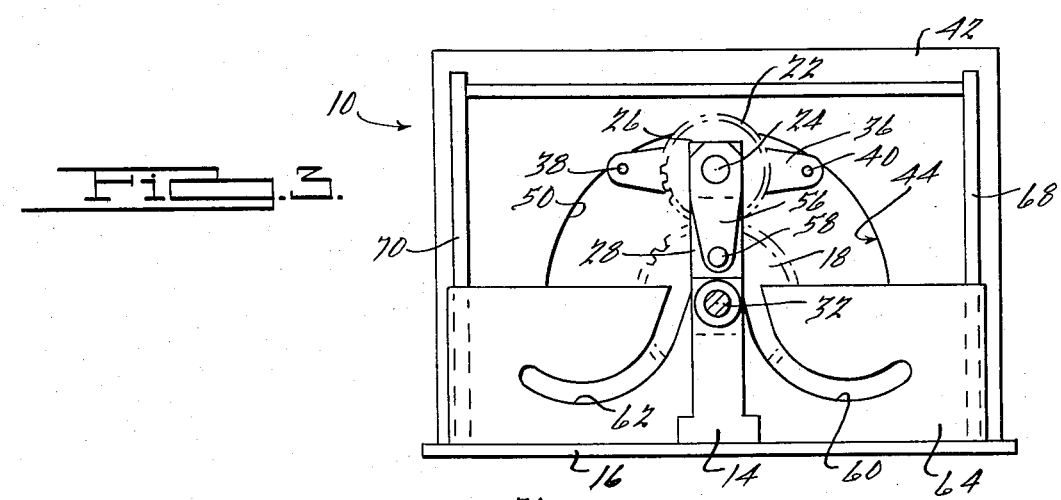
FIG. 3 is a back elevational view of the present invention.
Figure 4:
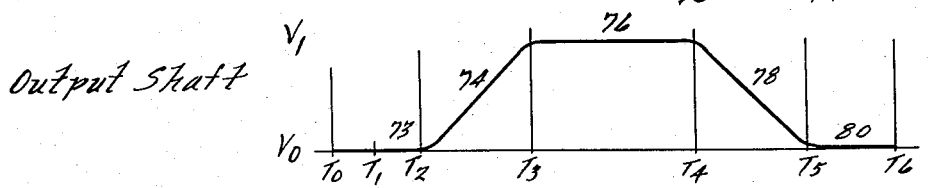
FIG. 4 is a graphical illustration of input shaft and output shaft velocities versus time for one embodiment of the present invention.
Figure 4:
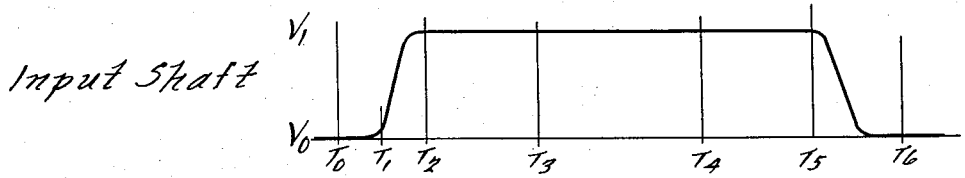

Referring now to FIGS. 1 through 3, there is illustrated therein a mechanical motion control apparatus indicated generally at 10 in accordance with the present invention. The mechanical motion control apparatus 10 comprises an input shaft 12 which is rotatably journaled in a support member 14 secured to a lower base member 16. A gear 18 is secured to one end 20 of the input shaft and is adapted to be rotated thereby. A second gear 22 is disposed in meshing engagement therewith, the second gear being supported on a shaft 24 which is journaled in one end 26 of an output shaft pivot arm 28, the other end 30 of which is fixedly secured and adapted to rotate with an output shaft 32. Thus, shaft 24 is supported in radial spaced relationship to output shaft 32 which is substantially coaxial with the input shaft and is similarly rotatably journaled in another portion of shaft support member 14. Shaft support member 14 is fixedly secured to a base member 16 which may form a portion of the transfer apparatus or other machinery for which the mechanical motion control mechanism 10 is adapted to be utilized.

Secured to the front face 34 of the second gear member is a cam follower support arm 36 which projects diametrically outward from opposite sides of the second gear member. First and second cam follower members 38 and 40 are secured to the outer ends of cam follower support arm 36 and are in the form of rollers adapted to follow along selective portions of a cam surface.

A front panel member 42 is also provided which has a curvilinear inwardly facing edge surface 44 machined thereon which provides the cam surface to be engaged by one or both of the cam follower members 38 and 40 provided on the cam support arm 36 secured to gear member 22. Cam surface 44 may be divided into five portions comprising a first dwell period 46, a first acceleration/deceleration period 48, a constant velocity period 50, a second acceleration/deceleration period 52, and a second dwell period 54.

Secured to the opposite end of shaft 24 supported in the output shaft pivot arm 28 is a secondary cam follower support arm 56 which has disposed at its opposite end a cam follower 58 similar to cam followers 38 and 40 provided on the cam follower support arm 36. Cam follower 58 is adapted to engage camming surfaces 60 and 62 provided on a rear surface member 64 during dwell periods or possibly end portions of acceleration/deceleration movement so as to provide a stabilizing effect to insure proper positioning of a workpiece being transferred by the motion control apparatus thereby assuring precise locating of the member being moved. In order to support the front and back panel members 42 and 64 which provide the camming surfaces, a pair of side members 68 and 70 are provided extending therebetween and generally perpendicular to the parallel planes of the front and back pieces.

Both dwell portions 46 and 54 as well as constant velocity portion 50 have constant radii of curvatures, the radius for the two dwell periods being equal. Also, the center of curvature of the constant velocity portion is necessarily coaxial with the axis of rotation of input shaft 12.

Figure 5:
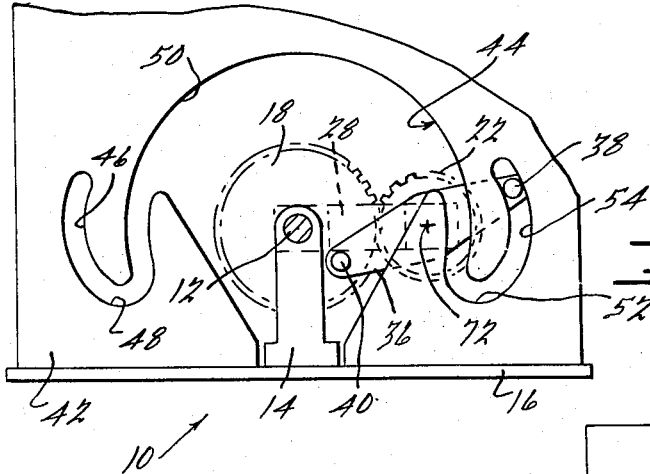
FIG. 5 is an elevational view similar to that of FIG. 1 but with the cam follower illustrated in a dwell position.
Figure 6:
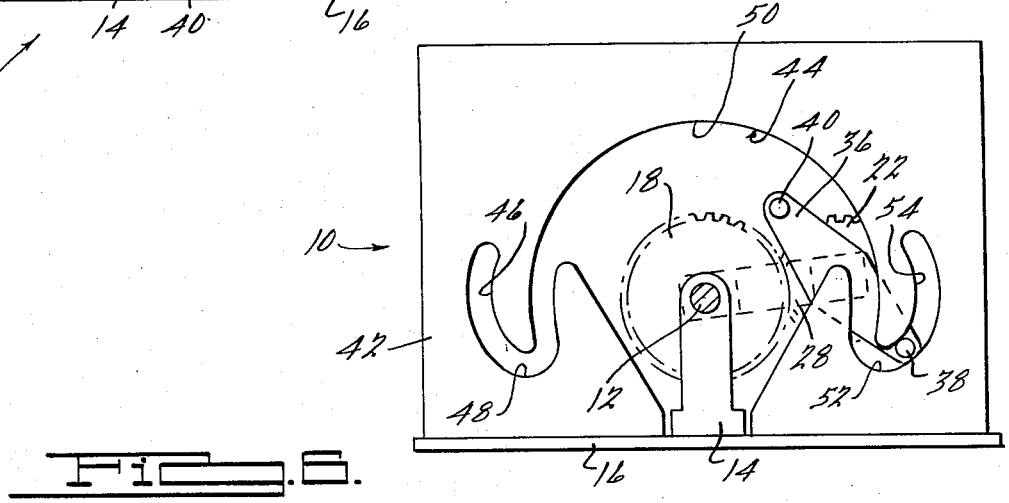
FIG. 6 is a view similar to that of FIG. 5 but illustrating the cam follower in a position of accelerating output shaft movement.

Referring now to FIGS. 3 through 6, the operation of the mechanical motion control mechanism of the present invention will now be explained in detail. We will assume for the purposes of explanation that the mechanical motion control apparatus is in a dwell position such as is illustrated in FIG. 5 with cam follower 38 engaging dwell portion 54 of camming surface 44. At time $T_1$ a driving means which is drivingly connected to input shaft 12 is turned on so as to cause accelerating rotational movement of input shaft 12 thereby causing rotational movement of gear member 18. During the period of time $T_1$ to time $T_2$ the rotation of the gear member 18 will impart rotational movement to gear member 22 as the rotational axis 72 of gear member 22 is positioned at the center of curvature of dwell portion 54. Also, cam follower 40 does not engage any surface during this period. Thus, both cam followers 38 and 40 are allowed to move freely in rotational movement along with gear member 22 providing a dwell period 73 during which output shaft 32 remains stationary. At time $T_2$ cam follower 38 enters acceleration/deceleration portion 52 of camming surface 44 at which time rotational movement of gear member 22 is caused to decrease and be gradually replaced by curvilinear or revolving motion of gear 22 with respect to output shaft 32. This acceleration period 74 will continue until time $T_3$ at which time cam follower 40 will have rotated into engagement with the constant velocity portion 50 of the camming surface 44. Thus, at time $T_3$ both cam followers 38 and 40 will be in engagement with spaced portions of the camming surface 44 thereby totally preventing rotational movement of gear member 22 in response to the rotational movement of gear member 18 and thereby forcing curvilinear motion of gear 22 as the gear member 18 is continued to be rotated. This constant velocity period 76 will continue until time $T_4$ at which time the leading cam follower member 40 will enter the deceleration portion 48 of the camming surface 44. During the period 78 from time $T_4$ to time $T_5$ the leading cam follower 40 will be moving into the deceleration portion 48 of the cam surface and the trailing cam follower 38 will be moving out of engagement with the camming surface 44 and beginning to rotate about the axis of rotation 72 of the gear member 22. As the input shaft continues to rotate gear member 18, the leading cam follower member 40 will move from the deceleration portion 48 into the dwell portion 46 during which time the movement of gear member 22 will become purely rotational in nature. This dwell period 80 will provide a sufficient time $T_5$ to time $T_6$ during which the driving force being applied to the input shaft 12 may be disengaged or turned off without concern as to overdriving or inaccurately positioning a workpiece being transferred by the mechanical motion control mechanism.

As is apparent gear 22, being rotatably supported in a pivot arm and having an axis of rotation spaced from the axis of rotation of the output shaft, rotational movement of gear member 22 will impart no motion whatsoever to output shaft 32. Thus, during the periods of dwell 73 and 80 there will be no movement of the output shaft even though gear member 22 is rotating in response to rotation of gear member 18 secured to the input shaft 12. However, during periods of acceleration respective of cam followers 38 and 40 will cause the rotational movement of gear member 22 to decrease and supplement such decreasing rotational movement with curvilinear movement thereby causing pivot arm 28 to impart a rotational movement to output shaft 32. Once the constant velocity portion 50 of the camming surface 44 has been entered, there will be no rotational movement of gear member 22 but rather all such rotational movement will be supplanted with pure curvilinear motion thereby causing pivot arm 28 to rotate through an arc of approximately 180° as illustrated until such time as a leading cam follower 38 or 40, depending on the direction of movement enters the deceleration portion 48 or 52 of the camming surface 44.

Referring specifically to FIG. 3, it will be seen that as cam followers 38 or 40 enter their respective acceleration/deceleration portions 52 and 48, cam follower support arm 56 will be caused to begin rotation due to the increasing rotational movement of gear 22. As either cam follower 38 or 40 moves into respective dwell portions 54 and 46, cam follower 58 will move into engagement with either cam surface 60 or 62 respectively thereby acting as a stabilizer to insure proper positioning of a workpiece to be thus transported. During the constant velocity portion of movement, cam follower support arm 56 will be longitudinally aligned with pivot arm 28. It should be noted that while cam follower support arm 56, associated cam follower 58 and cam surfaces 60 and 62 provide a steadying function, they may be omitted should this be desired for particular applications.

It should also be noted that the specific shape and contour of camming surface 44 may be varied to provide a wide variety of dwell periods, acceleration/deceleration, and/or constant velocity periods. For example, providing a longer acceleration/deceleration portion may be accomplished by lengthening portions 48 and 52 whereas greater or lesser dwell periods can be provided by increasing or decreasing the length of portions 46 and/or 52. The relative size of gears 18 and 22 will also affect the duration of dwell and acceleration/deceleration periods as well; that is to say, the greater the ratio of the diameter of gear 18 to gear 22, the shorter the dwell and acceleration periods.

Referring now to FIG. 7, there is illustrated another embodiment of the present invention indicated generally at 82 which is substantially identical to the embodiment of FIGS. 1 through 3, 5 and 6 described above with the exception of the driving connection between the input and output shaft. Accordingly, corresponding portions thereof are indicated by identical numbers primed. In this embodiment, gears 18 and 22 are replaced by sprockets 84 and 86 respectively, and a drive chain 88 is provided extending around portions of the circumference and between each of sprockets 84 and 86 so as to drivingly couple them together. The operation and motion produced will be substantially identical as that described above and therefore will not be described in detail. It should be noted, however, that while apparatus 82 employs a chain 88 and sprockets 84 and 86, any other suitable drive arrangement may be easily substituted therefor such as for example a pair of V-belt sheaves and an interconnecting V-belt.

Further, as illustrated in FIG. 8, another embodiment of the present invention is indicated generally at 90 which also is substantially identical to the embodiments described above and thus corresponding portions are indicated by like numerals double primed. However, in this embodiment, gears 18 and 22 are replaced by wheels 92 and 94 which are each provided with circumferential surfaces 96 and 98 respectively which provide a high coefficient of friction. For example, a circumferential surface coating or belt may be provided which has a high coefficient of friction and may be easily replaced when worn. In this embodiment circumferential surfaces 96 and 98 of wheels 92 and 94 respectively are in mutual frictional engagement so as to thereby transmit rotational forces between the input and output shafts.

The present invention may also be easily adapted to provide sequential dwell periods, acceleration periods, constant velocity periods, deceleration periods, and dwell periods with both linear input and output motions. Such an embodiment is illustrated and will be described with reference to FIG. 9.

Motion control apparatus 100 comprises a linear motion input drive means such as piston 102 having piston rod 104 extending outward therefrom and adapted to reciprocate longitudinally. The outer end 106 of piston rod 104 is connected to an input carriage assembly indicated generally at 108 upon which a rack 110 of suitable length and having upwardly facing longitudinally extending teeth 112 is secured. An output gear 114 having teeth 116 is mounted in meshing engagement with teeth 112 of rack 110 and has a cam follower support arm 118 fixedly secured to a side surface 119 thereof. Output gear 114 may be rotatably supported or mounted upon any desired output means (not shown) such as a carriage assembly or the like which is desired to be longitudinally reciprocated and which may be designed to carry a workpiece thereon.

Cam follower support arm 118 is generally T-shaped having outwardly projecting legs 120, 122 and 124 each of which is provided with cam followers 126, 128, and 130 respectively secured to the outer ends thereof.

A cam surface 132 is provided having a relatively straight longitudinally extending surface portion 134 which is adapted to be engaged by cam followers 126 and 128 so as to provide constant velocity motion. Arcuate shaped surface portions 136 and 138 are provided at opposite ends of straight surface portion 134 and merge smoothly therewith. Portions 136 and 138 are each adapted to engage cam followers 126 and 128 respectively so as to provide accelerating or decelerating motion depending upon the direction of movement of carriage assembly 108. Additional arcuate portions 140 and 142 merge smoothly with and extend from respective arcuate portions 136 and 138 and are adapted to engage corresponding cam followers 126 or 128 so as to provide dwell periods. Arcuate portions 140 and 142 are both of a constant radius of curvature the radius being substantially equal to the distance between the axis of rotation of gear 114 and respective cam followers 126 and 128.

As illustrated in FIG. 9, leg portion 124 of cam follower support arm 118 may be slighty longer than legs 120 and 122 and is provided with cam follower 130 which operates in a similar manner to that described above with reference to cam follower 58 to provide a steadying function during the dwell period. Accordingly, constant radius of curvature camming surfaces 144 and 146 are provided spaced slightly outward from respective surfaces 136, 140 and 138, 142.

The operation of motion control apparatus 100 is very similar to that described above with reference to apparatus 10. Let us assume that carriage assembly 108 is in the dwell position illustrated in phantom in FIG. 9 and about to begin movement to the left as seen therein. During the dwell period, that being the time during which cam follower 128 engages camming surface portion 142, gear 114 will be in pure rotational movement without any linear motion thereby allowing movement of piston rod 104 and rack 110 to the left. As cam follower 128 moves into arcuate camming surface portion 138, the pure rotational movement of gear 114 will decrease being supplanted by increasing or accelerating linear motion toward the left. When cam follower 126 moves into engagement with straight camming surface portion 134, all rotational movement of gear 114 will have ceased thereby preventing any further relative movement of rack 110 and gear 114 and thus producing a period of constant linear velocity toward the left due to the continued retracting of piston rod 104. As cam follower 126 moves into arcuate camming surface portion 136, the pure linear motion of gear 114 will be caused to decrease or decelerate being supplanted by rotational movement of gear 114 which in turn allows continued linear motion of rack 110. As cam follower 126 moves into camming surface portion 140, all linear motion of gear 114 will cease and be totally supplanted by rotational movement with cam follower 130 moving into camming surface portion 144 so as to insure precise accurate positioning of a workpiece being moved thereby.

As previously mentioned, the relative lengths of the camming surface portions may be varied to provide any desired combination of period durations. Further, varying the diameter of gear 114 will also allow variances in the rate of acceleration/deceleration and length of dwell periods for a given rate of travel of rack 110. It should be noted, the length or rack 110 must be sufficient to insure continuous engagement with gear 114 throughout the periods of rotational movement of gear 114 which requires rack 100 to be equal to twice the length of the arc through which gear 114 rotates during a single deceleration/acceleration dwell period.

While motion control apparatus 100 is illustrated employing a piston input drive arrangement, it should be noted that other linear drive arrangements may be easily substituted therefor. As illustrated in FIG. 10, a lead screw drive arrangement may be substituted therefor in which a rotating drive means 148 is drivingly connected to an elongated lead screw 150 which extends through and threadedly engages a cylindrical member 152 secured to input carriage assembly 108'. Thus rotation of lead screw 150 will cause longitudinal motion of carriage assembly in substantially the same manner as with piston 102.

Thus, as is apparent the present invention provides a relatively simple mechanical motion control mechanism which provides beginning and ending dwell periods during which a driving force connected to the input shaft may be either shut down or otherwise disconnected therefrom without loss of proper positioning of the workpiece being moved thereby. Further, the mechanism of the present invention requires relatively few moving parts thereby increasing a reliability thereof while maintaining extreme flexibility in that the arc periods defining dwell portions as well as the length of the acceleration periods and constant velocity periods may be easily varied to provide any desired combination of dwell acceleration/deceleration and constant velocity periods during the motion. Thus, the mechanical motion control mechanism of the present invention is uniquely adapted for transferring or otherwise moving articles into and out of machining apparatus or the like without subjecting the article being so moved to any jarring acceleration or deceleration forces as well as insuring that the articles are properly positioned in a desired location.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. Mechanical motion control apparatus comprising:
   drive means including an input shaft and a first gear fixedly secured to said input shaft;
   driven means including an output shaft disposed coaxially with said input shaft and a second gear rotatably supported upon another shaft in meshing engagement with said first gear, said output shaft being rotatably driven by said second gear;
   movement control means connected to said driven means, said movement control means including a cam surface and an associated cam follower means, said cam surface and cam follower cooperating to provide a period of pure rotational movement of said driven means, a period of decelerating rotational and simultaneous accelerating revolving movement of said driven means and a period of constant velocity revolving movement of said driven means relative to said drive means while said drive means continuously moves at a substantially constant velocity.

2. Mechanical motion control apparatus as set forth in claim 1 wherein said another shaft is radially spaced from said output shaft.

3. Mechanical motion control apparatus as set forth in claim 2 wherein said another shaft is secured to one end of a pivot arm, said pivot arm having another end secured to said output shaft.

4. Mechanical motion control apparatus as set forth in claim 1 wherein said second gear is operatively connected to and radially spaced from said output shaft, said movement control means and said drive means cooperating to selectively impart rotational movement to said output shaft through said second gear.

5. Mechanical motion control apparatus as set forth in claim 4 wherein said output shaft is stationary during said period of rotational movement of said movement control means and is accelerating during said period of decelerating rotational movement.

6. Mechanical motion control apparatus comprising:
   drive means;
   driven means driven by said drive means; and
   movement control means secured to said driven means, said movement control means including an elongated cam follower secured to said driven means, and a cam surface at least partially surrounding said drive and driven means, said cam surface cooperating with said cam follower to control movement of said driven means, so as to provide a period of pure rotational movement of said driven means, a period of decelerating rotational and simultaneous accelerating nonrotational movement of said driven means and a period of constant velocity nonrotational movement of said driven means relative to said drive means while said drive means continuously moves at a substantially constant velocity, said cam surface including a first portion comprising a slot having a constant radius of curvature for controlling said pure rotational movement, a second portion for controlling said decelerating rotational motion and a third portion for controlling said nonrotational motion, said third portion being of a constant radius of curvature having a center coaxial with the axis of rotation of said drive means.

7. Mechanical motion control apparatus as set forth in claim 6 wherein said drive means includes an input shaft, a first gear fixedly secured to said input shaft and said nonrotational movement is revolving movement.

8. Mechanical motion control apparatus as set forth in claim 7 wherein said driven means comprises a second gear rotatably supported upon a second shaft in meshing engagement with said first gear.

9. Mechanical motion control apparatus comprising:
   supporting means;
   an input shaft journaled in said supporting means;
   an output shaft journaled in said supporting means coaxial with and spaced from said input shaft;
   a drive gear fixedly secured to said input shaft;
   a pivot arm having one end secured to said output shaft;
   driven gear means journaled on said pivot arm in meshing engagement with said drive gear;
   an elongated cam follower support arm having a center portion secured to said driven gear and first and second cam followers secured to opposite ends thereof; and
   a camming surface secured to said support means, at least one of said first and second cam followers engaging said cam surface and cooperating therewith to control rotational movement of said output shaft.

10. Mechanical motion control apparatus as set forth in claim 9 wherein said camming surface provides a first portion cooperating with said cam followers to prevent rotation of said output shaft, a second portion cooperating with said cam followers to impart acceleration to said output shaft, and a third portion cooperating with said cam followers to impart a constant velocity motion to said output shaft.

11. Mechanical motion control apparatus as set forth in claim 10 wherein only one of said cam followers engages said first portion of said camming surface.

12. Mechanical motion control apparatus as set forth in claim 10 wherein both of said cam followers engage said third portion of said camming surface.

13. Mechanical motion control apparatus as set forth in claim 12 wherein said first, second, and third portions of said camming surface provide a continuous curvilinear path.

14. Mechanical motion control apparatus as set forth in claim 10 wherein said camming surface further includes a fourth portion cooperating with said cam followers to decelerate said output shaft and a fifth portion cooperating with said cam followers to prevent rotation of said output shaft.

15. Mechanical motion control apparatus comprising:
an input shaft;
a drive means supported on said input shaft;
a driven means supported in cooperating relationship with said drive means and adapted to be driven thereby;
an elongated cam follower support arm secured to said driven means;
a pair of cam followers secured to opposite ends of said support arm; and
a stationary cam surface adapted to selectively engage one or both of said cam followers, said cam surface having a first portion cooperating with said cam followers to allow rotational movement of said driven means, a second portion cooperable with said cam followers to impart accelerating curvilinear motion to said driven means and a third portion cooperable with said cam followers to impart constant velocity curvilinear motion to said driven means.

16. Mechanical motion control apparatus as set forth in claim 15 further including an output shaft operable connected to said driven means and wherein said input shaft rotates in a given direction from a time $T_s$ to a time $T_f$ and said output shaft is stationary until a time $T_o$, $T_o$ being between $T_s$ and $T_f$.

17. Mechanical motion control apparatus as set forth in claim 16 wherein said output shaft is accelerated for a time $T_a$ beginning at a time $T_o$, $T_a$ being less than $T_f - T_s$.

18. Mechanical motion control apparatus as set forth in claim 17 wherein said output shaft is decelerated at a time $T_d$, $T_d$ being subsequent to $T_o + T_a$ and prior to $T_f$.

19. Mechanical motion control apparatus as set forth in claim 14 wherein said output shaft is rotated at a constant velocity for a period of time equal to $T_f - T_d - (T_a + T_o)$.

* * * * *

UNITED STATES PATENT AND TRADEMARK OFFICE
CERTIFICATE OF CORRECTION

PATENT NO. : 4,224,830
DATED : September 30, 1980
INVENTOR(S) : Norbert Rust

It is certified that error appears in the above-identified patent and that said Letters Patent are hereby corrected as shown below:

Column 10, line 21, "14" should be --18--.

Signed and Sealed this

Third Day of March 1981

[SEAL]

Attest:

RENE D. TEGTMEYER

Attesting Officer

Acting Commissioner of Patents and Trademarks